Nov. 14, 1972   F. SCHADLICH   3,702,705
CHUCK
Filed May 27, 1970   2 Sheets-Sheet 1
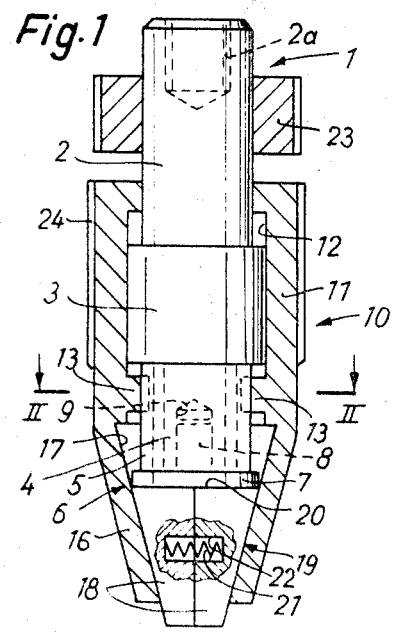
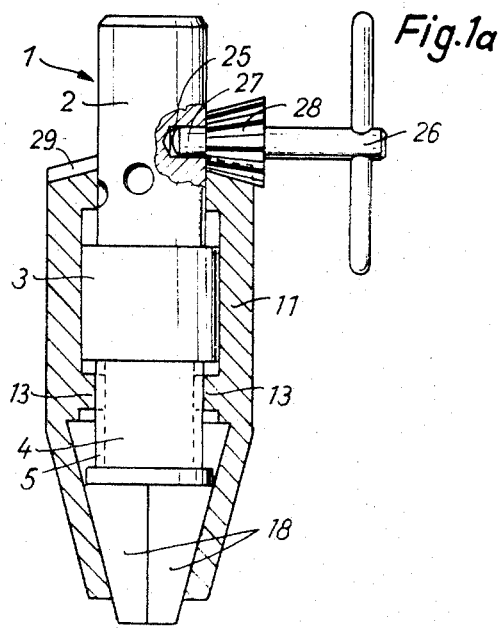
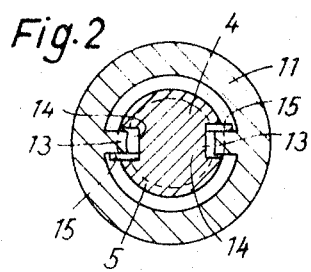
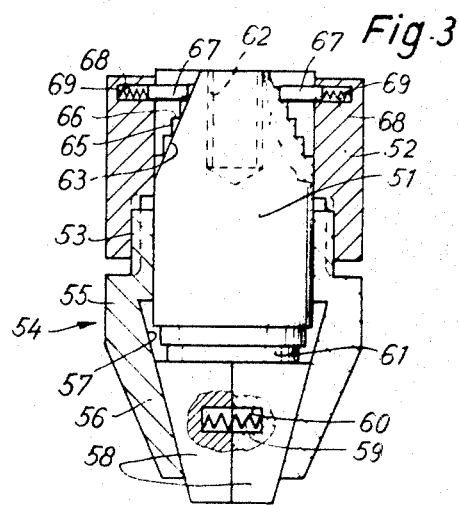
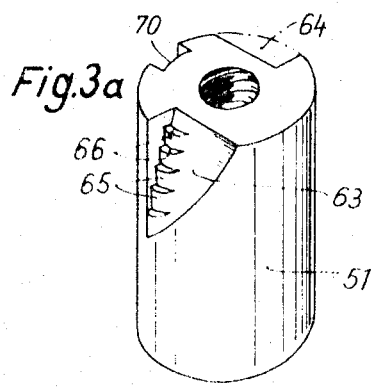
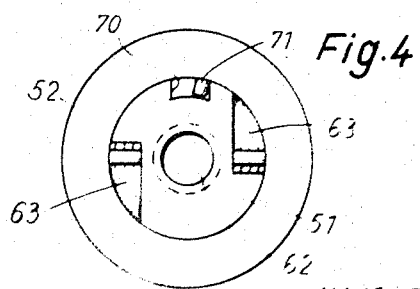
INVENTOR
Fritz SCHADLICH
his ATTORNEY Nov. 14, 1972  F. SCHADLICH  3,702,705
CHUCK Filed May 27, 1970  2 Sheets-Sheet 2

INVENTOR:
Fritz SCHADLICH

By
his ATTORNEY

United States Patent Office 3,702,705
Patented Nov. 14, 1972

---

3,702,705
CHUCK
Fritz Schadlich, Stetten, Germany, assignor to Robert Bosch G.m.b.H., Stuttgart, Germany
Filed May 27, 1970, Ser. No. 40,814
Claims priority, application Germany, June 7, 1969,
P 19 28 954.4
Int. Cl. B23b 31/19
U.S. Cl. 279—62                                7 Claims

ABSTRACT OF THE DISCLOSURE

A chuck has a sleeve, through an opening in a transverse wall of which a portion of a shaft member extends into the interior and towards the open end of the sleeve which is opposite and remote from the transverse wall. The inner circumferential surface of the sleeve tapers conically in direction towards the open end. A plate member is carried on the shaft extending normal to the axis thereof. A plurality of gripping jaws are located in the sleeve intermediate the plate member and open end. They each have an endface abutting the plate member and an outer surface complementary to and in engagement with a portion of the inner ciricumferential surface. Springs urge the gripping jaws permanently radially away from each other and into abutment with the plate member. Adjusting means permits movement of at least part of the sleeve axially of the shaft to rapidly displace the jaws relative to one another, and also permits rotary movement of at least part of the sleeve relative to the shaft so as to enable tightening of the jaws in their respective position.

BACKGROUND OF THE INVENTION

The present invention relates generally to a chuck, and more particularly to a chuck having a plurality of jaws. It is known to have chucks which comprise a sleeve having a transverse wall at one end through an opening in which a portion of a shaft member extends to the interior of the sleeve. A plate is carried by this shaft member extending transversely to the axis thereof and located in the sleeve intermediate the shaft member and the open end of the sleeve which is opposite to and axially spaced from the transverse wall, are several gripping jaws. The inner circumferential surface of the sleeve tapers conically towards the open end thereof and the gripping jaws have outer surfaces complementary to and in engagement with the portions of this inner circumferential surface. Springs urge the gripping jaws radially away from one another so that because of the conicity of the inner circumferential surface of the sleeve, the jaws are urged into abutting engagement with the plate member. When the plate member is moved towards the open end, it presses the jaws axially in the same direction and because of the conicity of the inner circumferential surface of the sleeve, the jaws also simultaneously will move radially inwardly towards one another.

Chucks of this type have become very popular and are widely used because they are simple in their construction and therefore inexpensive to produce. They are particularly suitable for power-driven tools, for instance, electrically or pneumatically operated manual drills or the like.

However, they do have a disadvantage, namely that their adjustment between a larger-diameter setting and a smaller-diameter setting—that is settings in which the jaws respectively define between tehmselves larger and smaller spaces for accommodating larger-diameter or smaller-diameter tools, such as drill bits—requires a relatively long time. This is particularly disadvantageous where the chuck is used with tools in which such diameter changes are frequently necessary. For instance, if the chuck is used on an electric hand drill by a do-it-yourself worker, then such changes are frequently necessary in rapid succession, owing to the fact that the amateur does not, obviously, have available to him the wider range of equipment used by professionals so that the single device—including its chuck—must be used for many different purposes which require different adjustments.

Thus, a chuck heretofore has been missing in the art which not only incorporates the advantages of the aforementioned prior-art chucks, but also permits a rapid change between various different diameters, that is, a rapid change to any setting within its diameter range.

SUMMARY OF THE INVENTION

It is, accordingly, an object of the present invention to provide such an improved chuck.

More particularly, it is an object of the present invention to provide a chuck of the type outlined above which affords the desired, rapid change to different settings within its diameter range.

Still more specifically, it is an object of the present invention to provide such an improved chuck which is also simple and inexpensive to construct.

In pursuance of the above objects, and other which will become apparent hereafter, one feature of the invention resides in a chuck which, briefly stated, comprises sleeve means having a transverse wall with an opening, an open end opposite to and axially spaced from said opening, and an inner circumferential surface which tapers conically in direction towards the open end. A shaft member extends through the opening and has an end portion located within the sleeve means. A plate member on the end portion extends in a plane normal to the axis of the shaft member and a plurality of gripping jaws are accommodated in the sleeve means intermediate the plate member and the open end. These gripping jaws each have an endface directed towards the plate member and an outer surface which is complementary to and in engagement with a portion of the inner circumferential surface.

Spring means urges the gripping jaws permanently radially away from each other and into abutment with the plate member.

According to the present invention, I provide adjusting means which enables movement of at least part of the sleeve means axially of the shaft member for rapid displacement of the jaws relative to one another, and for enabling rotary movement of at least part of the sleeve means relative to the shaft member to therby permit tightening of the jaws in their respective position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side-elevational section illustrating a first embodiment according to the present invention;

FIG. 1a is a view similar to FIG. 1 but illustrating an additional embodiment;

FIG. 2 is a section taken on line II—II of FIG. 1;

FIG. 3 is a view similar to FIG. 1 illustrating a further embodiment of the invention;

FIG. 3a is a perspective view of a component of the embodiment in FIG. 3;

FIG. 4 is a top-plan view of FIG. 3;

DESCRIPTION OF THE PREFERRED EMBODIMENT

Figure 5:
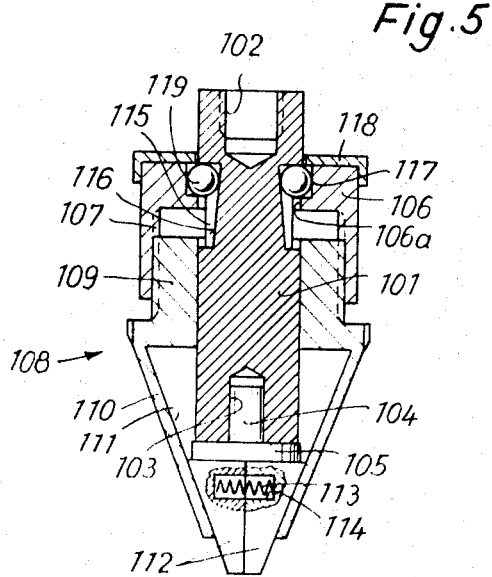
FIG. 5 is a view similar to FIG. 1, but illustrating still another embodiment of the invention.

Discussing now the drawing in detail, and firstly the embodiment illustrated in FIGS. 1 and 2, it will be seen that the chuck in this embodiment has a shaft member 1 which is composed of a cylindrical portion 2 to be connected with the non-illustrated rotary spindle of a power tool, such as a manually-held drill, a portion 3 located axially adjacent the portion 2 and having a somewhat larger diameter than the same, and a cylindrical portion 4 which follows the portion 3 at the side thereof remote from the portion 2. The portion 2 is provided in its free endface with a tapped recess 2a into which the threaded rotary spindle of the power tool can be inserted for connection of the chuck therewith.

The portion 4 is provided with an outer screw thread 5 having three turns. A component 6 consists of a plate member 7 extending transversely or normal to the axis of the shaft member 1, and a cylindrical pin 8 which is advantageously of one piece with the plate member 7 and extends into an axial bore 9 provided in the portion 4 of the shaft member 1. The shaft member 1 is turnably and longitudinally shiftably accommodated in a sleeve 10 having a cylindrical portion 11, a transverse wall of which is provided with a coaxial bore and which is provided with an interior coaxial space 12. In the space 12 is accommodated axially slidable but without freedom of a wobbly movement the cylindrical portion 3 of the shaft member 1.

The inner wall of the cylindrical portion 11 of the sleeve 10 is provided—in the region of the portion 4 of the shaft member 1—with two projections 13 which extend inwardly towards the axis of the chuck. They have screw threads capable of meshing with the external thread 5 on the portion 4 of the shaft member 1. Thus, the portion 11 can be threadly connected with the portion 4. However, by turning the portion 11 in counterclockwise direction (compare FIGS. 1 and 2) the sleeve member can be so adjusted that the projection 12 will become located within the longitudinal grooves 14 provided in the portion 4 of the shaft member 1. When this takes place, the sleeve member 10 can be shifted lengthwise of the shaft member 1.

An abutment 15 is provided in each of the grooves 14 so as to limit the rotation of the sleeve member 10 with reference to the shaft member 1 to a value smaller than half a turn. The provision of these abutments prevents—when the sleeve member is to be set so that it can be shifted lengthwise of the shaft member 1—the necessity for seeking to determine whether the projections 13 are located within the grooves 14. With this construction, it is simply necessary to turn the sleeve member counterclockwise until the projections 13 abut against the abutments 15 and then the sleeve member can be shifted lengthwise of the shaft member 1, the possibility of error thus being precluded.

The cylindrical portion 11 of the sleeve member 10 merges into a conical portion 16 having an interior cone 17 defined by the inner circumferential surface which tapers towards the open end—in FIG. 1 the lower end—of the sleeve member. Located within the interior cone 17 are several gripping jaws, in the illustrated embodiment three of them. They are identified with reference numeral 18 and can slide lengthwise of the sleeve member. Each of the jaws 18 has an outer surface 19 which is complementary to and in abutment with the corresponding portion of the inner circumferential surface defining the interior cone 17. Each of the gripping jaws further has an axial endface 20 directed towards and abutting against the plate member 7. Bores 22 are provided in the jaws (see FIG. 1) in which springs 21 engage which serve to permanently urge the jaws 18 radially away from one another. This urging, in conjunction with the divergence of the cone 17 in direction towards the plate member 7, causes the jaws to be maintained in abutment with the plate member 7 with their endfaces 20. The jaws will always tend to be in a position in which they are radially as far away from one another as possible.

The cylindrical portion of the shaft member 1 has fixedly secured thereto a knurled disk 23, and the cylindrical portion 11 of the sleeve member 10 is provided with an exterior knurled surface 24. This permits ready non-slip gripping of the members 23 and 10 by the fingers of a user, so as to enable rotary displacement of the sleeve member 10 with reference to the shaft member 1, as well as to permit axial displacement between them. It will be appreciated that FIG. 1 shows the chuck in closed position. No tool, such as a drill bit, is inserted. To make room for a certain-diameter tool, the chuck will be operated so as to slide the sleeve member 10 with reference to the shaft member 1 in direction towards the member 23, that is upwardly in FIG. 1. Depending upon the extent to which such sliding occurs, the space between the jaws 18 would be smaller or larger to accommodate a tool such as a drill bit of larger or smaller diameter. Once this coarse adjustment is effected, the sleeve member 10 is then rotated with reference to the shaft member 1 to tighten the jaws 18 into gripping engagement with whatever tool is now located between them.

The embodiment in FIG. 1a is substantially the same as in FIG. 1. It is, however, actuated differently. In FIG. 1a, the portion 2 of the shaft member 1 is provided with a plurality of holes 25 into which the pin 27 of a chuck key 26 can be inserted. The chuck key is provided with a bevel-gear portion 28 which when the check key is in the position shown in FIG. 1a, engages with corresponding bevelled teeth 29 on the sleeve member 11. This affords rotation of the sleeve 11 and the shaft member 1 with reference to one another in response to turning of the chuck key 26. Of course, when such turning occurs, the sleeve member 11 will longitudinally shift with reference to the shaft member 1 to some extent. For this reason, the holes 25 are spaced lengthwise of the shaft member 21 by such distances that the spacing between two successive holes 25 is the same or slightly smaller than the distance between two adjacent turns of the thread 5. The teeth on the bevel gear portion 28 and the teeth 29 on the sleeve member 11 have flanks which are long enough so that they can accommodate the shifting between the sleeve member 11 and the shaft member 1 which occurs during a scant half rotation of the sleeve member 11. The provision of the grooves 14 in the portion 4 of the shaft member 1, and the abutments 15 provided therein, makes it possible for the sleeve member 11 to be turned with reference to the shaft member 1 only by somewhat less than half a turn. In order to make the full dimensional range of the chuck useful, so that the chuck can be set between the positions in which it respectively accommodates the smallest and the largest tool—such as drill bit—with which it is to be used, the thread 5 has three turns.

The embodiments in FIGS. 3, 3a and 4 are different from the embodiments shown above. Here, a shaft is identified with reference numeral 51 and is surrounded by a portion 52 of the sleeve member. A second portion—the lower one in the drawing—is identified with reference numeral 54 connected with the portion 52 by means of screw threads 53. The portion 54 has a cylindrical section 55 and a conically tapering section 56. The thread 53 is provided on the section 55 and the section 56 has an inner circumferential surface 57 which conically tapers in direction away from the portion 52. Three jaws 58 are located within the section 56 and urged radially apart as before by three springs 59 which engage in bores 60 provided in the jaws 58.

The plate member 61 corresponds to the one identified with reference numeral 7 in the preceding figures, and is also connected axially immovably with the shaft member 51.

The upper free endface of the shaft 51 is provided with a tapped bore 62 for engagement of the shaft 51 with the rotary spindle of a power tool. In the upper third of the shaft 51, there are provided two flat facets 63 which are so inclined lengthwise to the axis of the shaft 51 that their ends which are directed towards the jaws 58 merge into the circumferential surface of the shaft 51. The other ends terminate at the free endface of the shaft 51 and the plan view shows that there is provided a shortened arcuate cutout 64 in this free endface, the shortening resulting from the fact that the wedge-shaped space defined by the facets 63 and the cylindrical surface of the portion 52 is bounded by a substantially radial edge of the shaft 51 which is located in the region of the center of the respective arcuate cutout. The facets are each provided with a plurality of planar faces 65 which are delimited with respect to the respective facet by faces 66 which are approximately normal to the axis of the shaft 51. Thus, there is provided a plurality of steps which follow one another in axial direction of the shaft 51. In the portion 52 there are provided pins 67, one for each facet, and these are guided in radial bores 68 with springs 69 permanently urging the pins 67 against the faces 65.

There is further provided a groove 70 in the outer surface of the shaft 51, extending in axial parallelism with the latter. A pin 71 is inserted from inside into the wall of the sleeve portion 52. This pin engages in part in the groove 70 and by abutment against the lateral walls thereof, it delimits the extent to which the portion 52 can be turned with respect to the shaft 51. In the end positions of such turning movement, the pins 67 either contact one of the faces 65 and thereby abut against the faces 66 to prevent movement of the portion 52 in axial direction, or they move onto the facets 63 on which they can slide to thereby permit axial shifting of the portion 52 lengthwise of the shaft 51.

When this is accomplished, the portion 52 is turned in clockwise direction and the pins 62 then again contact one of the faces 65 and by abutment against the faces 66, prevent further axial displacement of the portion 52 with reference to the shaft 51. This turning of the portion 52 is facilitated by the force of the springs 69 which are capable of expansion when this turning takes place. At the end of such turning movement, the quick adjustment to another diameter of the chuck, is completed. Now, the portion 54 is turned with reference to the portion 52, as is made possible by the presence of threads 53, and as the portion 54 is threaded deeper into the portion 52, the jaws 58 are tightly clamped against a tool, such as a drill bit, which is accommodated between them.

Figure 6:
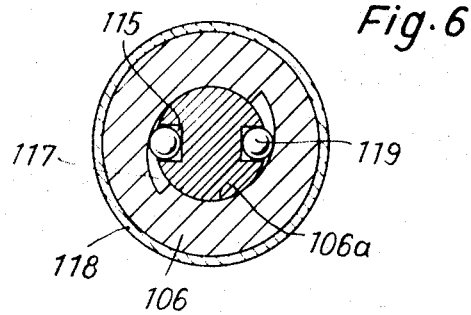
FIG. 6 is a section taken on line VI—VI of FIG. 5.

Finally, an additional embodiment is illustrated in FIGS. 5 and 6. Here, the shaft is identified with reference numeral 101 and again provided at its free end face with a tapped bore 102 for connecting the shaft with the rotary spindle of a power tool. The opposite end portion of the shaft is provided with a bore 103 into which the pin 104 of a plate member 105 extends. A portion 106 of the sleeve member has a bore 106a and surrounds the shaft 101. A second portion 108 is provided and connected with the portion 106 via threads 107. The portion 108 has a cylindrical section 109 provided with the threads 107, and a conically tapering section 110, the inner circumferential surface 111 of which defines a conical taper extending away from the portion 106. The jaws, which are again provided are identified with reference numeral 112 and are pressed apart by springs 113 engaging in bores 114 of the jaws 112. This is the same as before.

In this embodiment, however, the shaft 101 is provided in the region of the portion 106 with two grooves 115 extending in axial parallelism with the shaft. The bottom walls 116 of the screws 115 are inclined towards the axis in longitudinal direction of the shaft. The portion 106 is provided with two arcuate grooves 117 located in planes intersecting the axis and so curved that the bottom wall of the grooves 117 at one end merges into the inner bore 106a of the portion 106, whereas the opposite end is farther away from the axis of the shaft 101 until the groove 117 terminates in an approximately radial wall portion. The grooves 117 are covered by a covered portion 118. The cooperation of the grooves 115 and 117 provides two double wedge-shaped spaces, each of which accommodates a ball-shaped member 119 preferably of steel. If in this construction the portion 106 is turned clockwise with reference to the shaft 101—as in FIG. 6—then clamping engagement of the balls 119 between the bottom walls of the grooves 117 and the bottom wall 116 of the grooves 115 is released, and the portion 106 can now be shifted lengthwise of the shaft 101. When the desired end position has been reached, in which the jaws have been moved apart to the desired extent, or have been moved towards one another to the desired extent, the portion 106 is turned in counterclockwise direction to re-establish the clamping engagement. Now the portion 108 is turned with reference to the portion 106 to effect clamping engagement of the jaws with the drill bit or other tool located between them.

The illustrated embodiments, which are to be considered non-limiting, clearly indicate that the novel chuck according to the present invention permits a quick adjustment between the various diameter possibilities from the largest to the smallest and that once a desired setting has been reached, the clamping of the tool—such as a drill bit—can be effected in equally and simple manner.

It will be understood that each of the elements described above, or two or more together, may also find a useful application in other types of constructions differing from the types described above.

While the invention has been illustrated and described as embodied in a chuck, it is not intended to be limited to the details shown, since various modifications and structural changes may be made without departing in any way from the spirit of the present invention.

Wtihout further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A chuck, comprising sleeve means having a transverse wall with an opening, an open end opposite to and axially spaced from said opening, and an inner circumferential surface tapering conically in direction towards said open end; a shaft member extending through said opening and having an end portion located within said sleeve means and provided with an external thread and with at least two slots extending in parallelism with the axis of said shaft member; a corresponding number of inwardly directed tapped projections provided on said sleeve means and each receivable in one of said slots and also engageable with said external thread; a plate member on said end portion in a plane normal to the axis of said shaft member; a plurality of gripping jaws and said sleeve means intermediate said plate member and open end, said gripping jaws each having an endface directed towards said plate member and an outer surface complementary to and in engagement with a portion of said inner circumferential surface; spring means urging said gripping jaws permanently radially away from each other and into abutment with said plate member; and adjusting means enabling movement of at least part of said sleeve means axially of said shaft member for rapid displacement of said jaws relative to one another, and for enabling rotary movement of at least part of said sleeve means relative to said shaft member for permitting tightening of said jaws in their respective position.

2. A chuck as defined in claim 1, said shaft member having at least one hole arranged to receive a projection of a chuck key, and said sleeve means having teeth engageable with corresponding teeth in said chuck key for effecting rotary movement of said sleeve means relative to said shaft member in response to turning of said key.

3. A chuck as defined in claim 2; further comprising at least one additional hole in said shaft member similar to said one hole and spaced from the latter axially of said shaft member.

4. A chuck as defined in claim 1; further comprising manually operable means on said shaft member and sleeve means for effecting their relative rotary displacement manually.

5. A chuck as defined in claim 1; further comprising abutment means in said slots for permitting entry of said projections into said slots only in response to rotation of said sleeve means in a predetermined direction relative to said shaft member.

6. A chuck as defined in claim 1, said thread having a plurality of turns.

7. A chuck as defined in claim 6, said shaft member having two of said slots, and said thread having three turns.

References Cited

UNITED STATES PATENTS

| | | | |
|---|---|---|---|
| 2,040,517 | 5/1936 | Kopsch | 279—60 X |
| 1,225,089 | 5/1917 | Weir | 279—64 |
| 2,918,291 | 12/1959 | Plantas | 279—1 B |
| 2,931,660 | 4/1960 | Barwinkel | 279—1 B |

FOREIGN PATENTS

| | | | |
|---|---|---|---|
| 967,522 | 3/1950 | France | 279—60 |

ANDREW R. JUHASZ, Primary Examiner

Z. R. BILINSKY, Assistant Examiner

U.S. Cl. X.R.

279—1 B, 64